(12) United States Patent
Lu et al.

(10) Patent No.: US 10,736,032 B2
(45) Date of Patent: Aug. 4, 2020

(54) METHOD FOR CLOUDLET-BASED OPTIMIZATION OF ENERGY CONSUMPTION

(71) Applicant: Huazhong University of Science and Technology, Wuhan, Hubei (CN)

(72) Inventors: Feng Lu, Hubei (CN); Ziqian Shi, Hubei (CN); Ruoxue Liu, Hubei (CN); Song Wu, Hubei (CN); Hai Jin, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 24 days.

(21) Appl. No.: 16/193,805

(22) Filed: Nov. 16, 2018

(65) Prior Publication Data

US 2019/0208467 A1    Jul. 4, 2019

(51) Int. Cl.
*G06F 9/46* (2006.01)
*H04W 52/02* (2009.01)
*H04L 29/08* (2006.01)
*H04W 88/02* (2009.01)

(52) U.S. Cl.
CPC ......... *H04W 52/0209* (2013.01); *H04L 67/10* (2013.01); *H04W 88/02* (2013.01)

(58) Field of Classification Search
None
See application file for complete search history.

(56) References Cited

U.S. PATENT DOCUMENTS

2012/0072481 A1    3/2012    Nandlall et al.

FOREIGN PATENT DOCUMENTS

CN    104754063 A    7/2015
CN    107370799 A    11/2017

*Primary Examiner* — Gregory A Kessler
(74) *Attorney, Agent, or Firm* — Michael X. Ye; Morris, Manning & Martin, LLP

(57) ABSTRACT

The present invention relates to a method for cloudlet-based optimization of energy consumption, comprises: building a cloudlet system that comprises: at least two cloudlets and a mobile device wirelessly connected to the cloudlets, so that the cloudlets provide the mobile device wirelessly connected thereto with cloud computing services; acquiring system data related to the mobile device from the cloudlet system for analyzing a data volume to be handled by the mobile device locally and setting an initial operating frequency $F_{Linitial}$ for a first processor of the mobile device according to the data volume; and based on a tolerable latency range T of a task queue, dynamically deciding a scheduling strategy for individual task of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

8 Claims, 10 Drawing Sheets

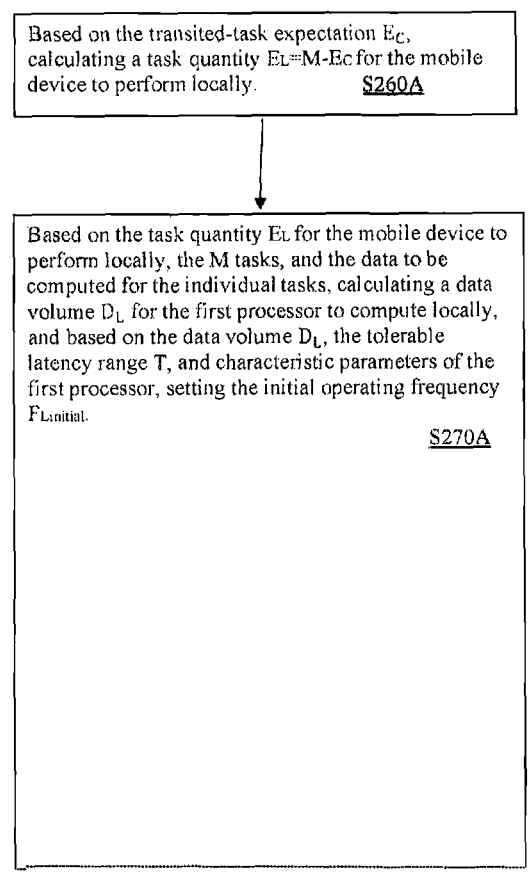
FIG. 5 (con't)

Based on the action $A_i$ taken, calculating a frequency transition probability $P^F(F_L, F'_L | A_i)$ of the first processor, so as to obtain a state-transition matrix $\vec{F}$ of the frequency, wherein $F_L$ is the operating frequency of the first processor in the present state $S$, and $F'_L$ is the operating frequency of the first processor possibly used by the mobile device when transition to the next state is completed.  S340A

Based on an optimization target $V_t(S) = \min_{\emptyset(S, A_i)} H_t(S, A_i)$, calculating the scheduling strategy $\emptyset^*_t(S) = \arg\min_{\emptyset(S, A_i)} H_t(S, A_i)$ through value iteration, and based on the scheduling strategy setting the present operating frequency $F_L$ of the first processor, wherein $H_t(S, A_i)$ is user energy consumption generated when the action $A_i$ is taken in the state $S$, and $\emptyset(S, A_i)$ is a probability for the user to take the action $A_i$ in the present state $S$.  S350A

FIG. 6 (con't)

METHOD FOR CLOUDLET-BASED OPTIMIZATION OF ENERGY CONSUMPTION

FIELD

The present invention relates to task scheduling strategies for cloud computing, and more particularly to a method and system for cloudlet-based optimization of energy consumption.

DESCRIPTION OF RELATED ART

With the blowout-like growth of both applications and data used in mobile devices, energy consumption have become an increasingly critical and demanding issue to designers of mobile devices. However, mobile devices are powered by batteries that are inherently limited in terms of capacity, and unfortunately the development of battery energy density has failed to catch up the increase of energy consumption seen in modern mobile devices.

As mobile devices consume more energy, efficient use of energy in mobile devices has drawn more attention. As to energy conservation, the most popular schemes include data transmission energy conservation, task transition, and CPU frequency regulation, in which the latter two are the focus of the present invention. The existing task transition strategies can be divided into cloud-oriented task transition and cloudlet-oriented task transition.

Therein, cloud-oriented task transition primarily involves having remote cloud servers to help a user with his/her tasks. Due to physical locations of clouds, this known approach has the following defects: (1) It has higher latency in data transmission, making the user spend too much time on receiving task results; (2) It consumes more energy for data transmission, because cloud servers located remotely can sometimes aggravate energy consumption at the mobile terminal; (3) Since CPU frequency regulation can only be achieved using the time difference between results of immediately successive tasks returned by clouds, the amplitude of frequency modulation is limited, preventing it from effective energy conservation.

On the other hand, cloudlet-oriented task transition primarily uses cloudlets that are two-dimensionally stochastic distributed and geographically closer to the user to share the tasks of the user, thereby reducing network latency and minimizing energy consumption at the user side. However, this known approach also has some defects: (1) Due to the stochastic nature of cloudlet distribution and the stochastic nature of user mobility, it is almost impossible to accurately predict the quantity of tasks that can be transited and whether the task is transited successfully, so the utilization rate of cloudlet resources and the success probability of task transition are often not satisfying, leading to waste of time and aggravated energy consumption at the mobile device, being unfavorable to energy conservation; (2) Since CPU frequency regulation has not been successfully applied to task transition in a cloudlet environment, there is no way to regulate the mobile device based on prediction of the size of transited tasks, and to ensure that the mobile device can complete its tasks while operating in a low-frequency state, making reduction of energy consumption limited.

SUMMARY OF THE INVENTION

For addressing the shortcomings of the prior art, the present invention provide a method for cloudlet-based optimization of energy consumption. By expecting how many tasks may be transited to cloudlets in advance, cloudlet resources can be used more efficiently. The expectation is further used as a basis for setting an initial operating frequency for a first processor of a mobile device, so that the mobile device can operate in a low-frequency state while promising timely completion of its tasks, thereby significantly reduce energy consumption at the mobile device. In addition, during mobility of the user, a scheduling strategy is determined for each task in a dynamic way using a Markov Decision Process and the present operating frequency of the first processor of the mobile device is regulated accordingly. This not only ensures timely completion of tasks, but also minimizes energy consumption of the mobile device.

According to one preferred mode, a method for cloudlet-based optimization of energy consumption comprises: building a cloudlet system that comprises: at least two cloudlets and a mobile device wirelessly connected to the cloudlets, so that the cloudlets provide the mobile device wirelessly connected thereto with cloud computing services; acquiring system data related to the mobile device from the cloudlet system for analyzing a data volume to be handled by the mobile device locally and setting an initial operating frequency $F_{Linitial}$ for a first processor of the mobile device according to the data volume; and based on a tolerable latency range T of a task queue, dynamically deciding a scheduling strategy for individual task of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

According to one preferred mode, the step of acquiring the system data related to the mobile device from the cloudlet system for analyzing the data volume to be handled by the mobile device locally and setting the initial operating frequency $F_{Linitial}$ for the first processor of the mobile device based on the data volume comprises: based on distribution properties of the at least two cloudlets and mobility characteristics of a user holding the mobile device, calculating a task quantity expectation $E_C$ for the tasks that the mobile device is expected to transit to the cloudlet system during its moving with the user; based on the task quantity expectation $E_C$, acquiring the data volume to be handled locally by the mobile device; and based on the data volume, setting the initial operating frequency $F_{Linitial}$ of the first processor of the mobile device, wherein, the distribution properties obey Poisson Distribution two-dimensionally, and the mobility characteristics of the user obey a stochastic mobility model.

According to one preferred mode, the step of based on the tolerable latency range T of the task queue dynamically deciding the scheduling strategy for individual task of the task queue using the Markov Decision Process, and setting the present operating frequency $F_L$ for the first processor of the mobile device corresponding to the scheduling strategy, so as to enable the mobile device to complete the tasks within the tolerable latency range T with minimal energy consumption comprises: defining a state space and an action space in the mobile device, wherein the state space contains: states of the tasks to be performed, states of the cloudlet(s) available for connection, and a regulation range of the operating frequency of the first processor, and the action space contains: a first action and a second action, in which the first action denotes that the task is performed locally, and the second action denotes that the task is transited to and performed in the cloudlets; and based on the state space and the action space, determining the scheduling strategy that is optimal through value iteration; and making the mobile device set the present operating frequency $F_L$ of the first processor based on the scheduling strategy.

According to one preferred mode, the step of acquiring the system data related to the mobile device from the cloudlet system for analyzing the data volume to be handled by the mobile device locally and setting the initial operating frequency $F_{Linitial}$ for the first processor of the mobile device according to the data volume comprises: based on actual distribution situations and distribution properties of the cloudlets in a mobility area of the user, determining a cloudlet distribution density $\lambda_c$ and a cover range radius R of the mobility area, wherein the distribution properties obey Poisson Distribution two-dimensionally; based on the mobility characteristics that obey the stochastic mobility model, determining a mobility velocity V of the user; acquiring the task queue to be handled by the mobile device, wherein the task queue contains M tasks and has the tolerable latency range T, in which the individual task has respective transmission data $\{DT_1, DT_2 \ldots, DT_M\}$, and the individual task has respective computing data $\{DC_1, DC_2 \ldots, DC_M\}$; based on the mobility velocity of the user and a distance from a starting point to a terminal point of mobility of the user and the stochastic geometry theory, calculating a cover time $T_C$ during which the user passes a cloudlet cover area during the mobility of the user; based on a transmission bandwidth $B_C$ of the cloudlets and an operating frequency $F_C$ of a second processor of the cloudlet, calculating an average time $\overline{T}$ for which M tasks are performed in the cloudlets, and based on the cover time $T_C$ and the average time $\overline{T}$, acquiring a transited-task expectation $$E_C = \frac{T_C}{\overline{T}};$$

based on the transited-task expectation $E_C$, calculating a task quantity $E_L = M - E_C$ for the mobile device to perform locally; and based on the task quantity $E_L$ for the mobile device to perform locally, the M tasks, and the data to be computed for every individual task, calculating a data volume $D_L$ for the first processor to compute locally, and based on the data volume $D_L$, the tolerable latency range T, and characteristic parameters of the first processor, setting the initial operating frequency $F_{Linitial}$.

According to one preferred mode, the cover time $T_C$ is calculated using an equation:

$$T_C = \frac{L(1 - e^{-\pi R^2 \lambda_C})}{V},$$

wherein L is the distance from the starting point to the terminal point of the mobility of the user; and the average time $\overline{T}$ is calculated using an equation:

$$\overline{T} = \frac{\frac{\sum_{i=1}^{M} DT_i}{B_C} + \frac{\sum_{i=1}^{M} DC_i}{F_C}}{M}.$$

According to one preferred mode, the step of based on the tolerable latency range T of the task queue, dynamically deciding the scheduling strategy for individual task of the task queue using the Markov Decision Process, and setting the present operating frequency $F_L$ for the first processor of the mobile device corresponding to the scheduling strategy, so as to enable the mobile device to complete the tasks within the tolerable latency range T with minimal energy consumption comprises: setting user state space $\theta \in \{S=(i, N, F_L) \in S | i \in G, N \in \{0, 1 \ldots \hat{N}\}, F_L \in \{f_1, f_2 \ldots f_J\}\}$ and action space $A = \{0, 1\}$, where i denotes the task performed presently, N denotes the number of the cloudlets presently available for connection, $F_L$ denotes the operating frequency of first processor, 0 in the action space A denotes that the task is performed locally, and 1 in the action space A denotes that the task is transited to and performed in the cloudlets; based on Poisson Distribution properties of the cloudlets and the cloudlet distribution density $\lambda_c$, calculating a probability $P^N$ (N, N') of the number of the cloudlets presently available for connection to the user, so as to obtain a state-transition matrix $\vec{N}$ of the cloudlets, wherein N is a number of the cloudlets available for connection in the present state S, and N' is a number of the cloudlets becoming available for connection when transition to a next state S' is completed; based on $DT_i$ and $DC_i$ of the present task and an action $A_i$ taken, calculating a probability $P^G$ (G, G'|$A_i$) for the present task to successfully transit into the next task, so as to obtain a state-transition matrix $\vec{G}$ of the tasks; based on the action $A_i$ taken, calculating a frequency transition probability $P^F(F_L, F'_L|A_i)$ of the first processor, so as to obtain a state-transition matrix $\vec{F}$ of the frequency, wherein $F_L$ is the operating frequency of the first processor in the present state S, and $F'_L$ is the operating frequency of the first processor possibly used by the mobile device when transition to the next state is completed; based on an optimization target $$V_t(S) = \min_{\emptyset(S, A_i)} H_t(S, A_i),$$

calculating the scheduling strategy $$\emptyset_t^*(S) = \arg_{\emptyset(S, A_i)} \min H_t(S, A_i)$$

through value iteration, and based on the scheduling strategy setting the present operating frequency $F_L$ of the first processor, wherein $H_t(S, A_i)$ is user energy consumption generated when the action $A_i$ is taken in the state S, and $\emptyset(S, A_i)$ is a probability for the user to take the action $A_i$ in the present state S.

According to one preferred mode, the probability for the present task to successfully transit into the next task is calculated using an equation:

$$P^G(G, G'|A_i) = \begin{cases} \left(\frac{DT_i}{B_C} + \frac{DC_i}{F_C}\right) \times \frac{3V}{R} \times \eta_a & A_i = 1 \\ 1 & A_i = 0 \end{cases},$$

wherein $$\frac{3V}{R}$$

is an average time that the user maintains connection with the cloudlet, and $\eta_a$ is a probability for the presently connected cloudlet to accept a request of task transition from the user.

According to one preferred mode, the probability $\eta_a$ for the presently connected cloudlet to accept a request of task transition from the user is figured out based on a resource occupation level and/or a task queuing level of the presently connected cloudlet.

According to one preferred mode, in the optimization target $$V_t(S) = \min_{\phi(S, A_i)} H_t(S, A_i),$$

$$H_t(S, A_i) = C(S, A_i) + \gamma \sum P(S, S' \mid A_i) V_{t+1}(S'),$$

wherein $C(S, A_i)$ is direct energy consumption generated by the first processor when the action $A_i$ is taken in the state S, and $\gamma$ is a discount factor of energy consumption generated by the first processor in the next state S'.

According to one preferred mode, the cloudlet system comprises: at least two cloudlets and a mobile device wirelessly connected to the cloudlets, so that the cloudlets provide the mobile device wirelessly connected thereto with cloud computing services; and a first device that acquires system data related to the mobile device from the cloudlet system for analyzing a data volume to be handled by the mobile device locally and sets an initial operating frequency $F_{Linitial}$ for a first processor of the mobile device according to the data volume, wherein the first device based on a tolerable latency range T of a task queue dynamically decides a scheduling strategy for individual task of the task queue using a Markov Decision Process, and sets a present operating frequency $F_L$ for the first processor of the mobile device corresponding to the scheduling strategy, so as to enable the mobile device to complete the tasks within the tolerable latency range T with minimal energy consumption.

The method for cloudlet-based optimization of energy consumption according to the present invention provides at least the following beneficial effects: (1) With cloudlet distribution obeying Poisson Distribution and user mobility obeying stochastic mobility model, the present invention expects how many tasks may be transited to cloudlets in advance, cloudlet resources can be used more efficiently. The expectation is further used as a basis for setting an initial operating frequency for a first processor of a mobile device, so that the mobile device can operate in a low-frequency state while promising timely completion of its tasks, thereby significantly reduce energy consumption at the mobile device; (2) During mobility of the user, a scheduling strategy is determined for each task in a dynamic way using a Markov Decision Process. This ensures successful task transition and prevents energy consumption due to unnecessary data transmission; (3) In the process of dynamically scheduling tasks, the present invention dynamically regulate the present operating frequency of the first processor of the mobile device according to the scheduling result of every task, so as to ensure that the mobile device operate in the lowest-frequency state within the task tolerable latency range. This not only ensures timely completion of tasks, but also minimizes energy consumption for local computing.

DETAILED DESCRIPTION OF THE INVENTION

Figure 1:
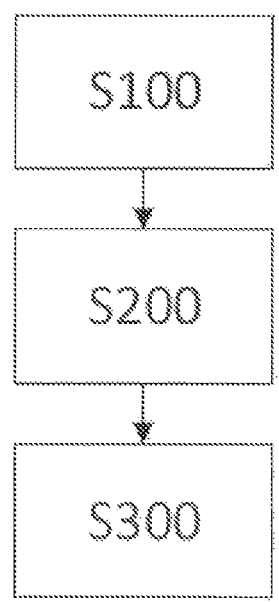
FIG. 1 is a flowchart of the method of the present invention according to one preferred embodiment.

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

Terms referred to in the present invention are defined first as below.

A cloudlet is a mobility-enhanced small-scale cloud datacenter that is located at the edge of the Internet and is to be used by nearby devices. For example, it may provide nearby devices with computing and/or storing services. As compared to a cloud, a cloudlet is geographically closer to its users and provides services to nearby devices with less latency. A cloudlet may have other equivalent designations, such as a follow me cloud and a mobile micro-cloud. Thus, as long as they are used in a substantially equivalent way to the term cloudlet as used in the present invention, all these designations shall also be deemed as falling in the scope of the present invention.

A distributed cloudlet environment is an environment in which cloudlets are distributed two-dimensionally following Poisson Distribution with a certain density, so that a user on the move may require connecting the cloudlet closest to him/her depending on distance and/or other factors.

A state space refers to a collection of all the states appearing throughout mobility of the user and the task transition process.

An action space contains the actions taken by task transition either performed locally or performed by the cloudlet.

A state-transition matrix is a matrix composed of levels of probability that the user transits form the present state to another state during his/her mobility and the task transition process.

A Markov process is a process where a decision maker observes a stochastic dynamic system having Markov properties periodically or continuously, and makes decisions sequentially. In other words, the decision maker makes decisions by choosing an action from an available collection of actions according to individual state he/she observes at different moments. The next state of the system is stochastic, and its state transition probability has Markov properties. The decision-maker makes a new decision according to a new observed state, and repeats this process. Markov property is property that a stochastic process whose law of probability about its future development is irrelevant to its history as observed. It may be briefly described as non-aftereffect property of the state transition probability. A stochastic process whose state transition probability has Markov property is a Markov process.

Embodiment 1

The present embodiment discloses a method for cloudlet-based optimization of energy consumption. The disclosed method may comprise: building a cloudlet system that comprises at least two cloudlets. When a mobile device enters a cover area of one cloudlet and wirelessly connects to the cloudlet, the cloudlet system can provide the mobile device with cloud computing service. Preferably, the at least two cloudlets are communicatively connected to each other. Preferably, when the mobile device is connected to the cloudlets, it becomes part of the cloudlet system. Preferably, the cloudlet system may further comprise: a management device. The management device collects information about various constitutive devices of the cloudlet system and analyzes and processes it into system data. For example, the management device may acquire cloudlet configuration information and cloudlet state information about the at least two cloudlets. Therein, the cloudlet configuration information may comprise at least one of its connection bandwidth, the operating frequency of the second processor, and its effective communication radius. The cloudlet state information may comprise its resource occupation level, and/or a task queuing level. As a further example, the management device may further acquire the mobile device configuration information and mobile device state information about the mobile device. The mobile device configuration information may comprise characteristic parameters of the first processor. The mobile device state information may comprise movement states, the situation of the task queue, and the tolerable latency range T of the task queue. Particularly preferably, the management device is at least one of the at least two cloudlets.

According to one preferred mode, the disclosed method may further comprise: acquiring system data of the cloudlet system. The system data may be used in analysis of the data volume to be handled by the mobile device locally. The initial operating frequency $F_{Linitial}$ of the first processor of the mobile device may be set according to the data volume. The system data may comprise information about the locations of the cloudlets, the distribution density of cloudlets, the cover range radius, the mobility velocity of the user, the number of tasks in the task queue and/or the sizes of task data. The initial operating frequency of the first processor is set to change the presetting of the frequency of the first processor made by the system. This is because according to the presetting, all the tasks in the task queue would be performed locally. For timely completion of the tasks, the frequency is relatively great. Without the initial operating frequency, regulation of the frequency of the first processor could be only made according to the scheduling of every task, thus the regulation range would be limited because the frequency can only be regulated within the range of one task each time. Instead, setting the initial operating frequency allows an overall prediction based on the full view of the task queue, and in turn allowing maximum conservation of energy consumption at the first processor.

According to one preferred mode, the disclosed method may further comprise: based on the tolerable latency range T of the task queue, dynamically deciding a scheduling strategy for individual tasks of the task queue using a Markov Decision Process. By setting a present operating frequency $F_L$ for the first processor of the mobile device corresponding to the scheduling strategy, the mobile device is able to complete the tasks within the tolerable delay range T with minimal energy consumption. The tolerable latency range T is the deadline for completing the task queue. After the initial operating frequency of the first processor is set, the dynamic decision based on the Markov Decision Process may perform ongoing iteration and update to the present operating frequency according to the actual situation, so as to gradually optimize the frequency regulation.

According to one preferred mode, referring to FIG. 1, the disclosed method may comprise: Step S100: building a cloudlet system, the cloudlet system comprises: at least two cloudlets and mobile device. The cloudlets provide the mobile device wirelessly connected thereto with cloud computing services; Step S200: making a mobile device (or a management device) acquire system data related to the mobile device from the cloudlet system for analyzing a data volume to be handled by the mobile device locally and set an initial operating frequency $F_{Linitial}$ for a first processor of the mobile device according to the data volume; Step S300: based on a tolerable latency range T of a task queue, making the mobile device (or the management device) dynamically decide a scheduling strategy for individual task of the task queue using a Markov Decision Process, and set a present operating frequency $F_L$ for the first processor of the mobile device corresponding to the scheduling strategy, so as to enable the mobile device to complete the tasks within the tolerable latency range T with minimal energy consumption.

According to another alternative preferred mode, also referring to FIG. 1, the disclosed method may comprise: Step S100: building a cloudlet system that may comprise: at least two cloudlets, a management device and a mobile device, wherein the cloudlets provide the mobile device wirelessly connected thereto with cloud computing services; Step S200: making the management device acquire system data related to the mobile device from the cloudlet system for analyzing a data volume to be handled by the mobile device locally, and set an initial operating frequency $F_{Linitial}$ for a first processor of the mobile device according to the data volume; and Step S300: based on a tolerable latency range T of a task queue, dynamically deciding a scheduling strategy for individual task of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

According to another alternative preferred mode, referring to FIG. 1 again, the disclosed method may comprise: Step S100: building a cloudlet system, cloudlet system may comprise: at least two cloudlets, a management device and a mobile device, wherein the cloudlets provide the mobile device wirelessly connected thereto with cloud computing service, and a specialized sensor is integrated in the mobile device; Step S200: making the specialized sensor acquire system data related to the mobile device from the cloudlet system for analyzing a data volume to be handled by the mobile device locally, and set an initial operating frequency $F_{Linitial}$ for a first processor of the mobile device according to the data volume; Step S300: based on a tolerable latency range T of a task queue, making the specialized sensor dynamically decide a scheduling strategy for individual tasks of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

According to one preferred mode, Step S200 may comprise: based on distribution properties of the at least two cloudlets and mobility characteristics of a user holding the mobile device, calculating a task quantity expectation $E_C$ for the tasks that the mobile device is expected to transit to the cloudlet system during its moving with the user; based on the task quantity expectation $E_C$, acquiring the data volume to be handled locally by the mobile device; and based on the data volume, setting the initial operating frequency $F_{Linitial}$ of the first processor of the mobile device, wherein, the distribution properties obey Poisson Distribution two-dimensionally, and the mobility characteristics of the user obey a stochastic mobility model. Since the task quantity expectation is calculated with the cloudlet distribution obeying Poisson Distribution and with mobility of the user obeying the stochastic mobility model, the computing process is simplified, leading to reduced occupation of computing resources and energy consumption of the system, while improving the whole system in terms of fluency.

Figure 2:
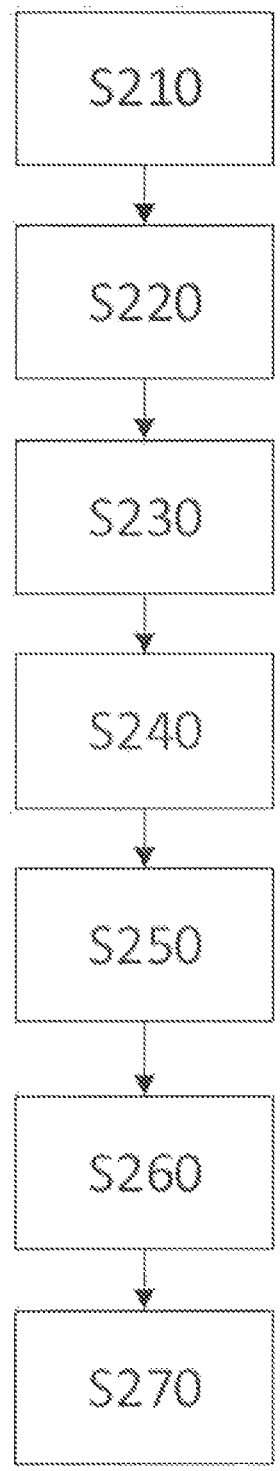
FIG. 2 is a flowchart showing sub-steps of Step 200 of the method of the present invention according to one preferred embodiment.

Preferably, referring to FIG. 2, Step S200 may comprise the following sub-steps: Step S210: based on actual distribution situations and distribution properties of the cloudlets in a mobility area of the user, determining a cloudlet distribution density $\lambda_c$ and a cover range radius R of the mobility area, wherein the distribution properties obey Poisson Distribution two-dimensionally; Step S220: based on the mobility characteristics that obey the stochastic mobility model, determining a mobility velocity V of the user; Step S230: acquiring the task queue to be handled by the mobile device, wherein the task queue contains M tasks and has the tolerable latency range T, in which the individual task has respective transmission data $\{DT_1, DT_2 \ldots, DT_M\}$, and the individual task has respective computing data $\{DC_1, DC_2 \ldots, DC_M\}$; Step S240: based on the mobility velocity of the user and a distance from a starting point to a terminal point of mobility of the user and the stochastic geometry theory, calculating a cover time $T_C$ covering a cloudlet cover area during the mobility of the user; Step S250: based on a transmission bandwidth $B_C$ of the cloudlets and an operating frequency $F_C$ of a second processor of the cloudlet, calculating an average time $\overline{T}$ for which the M tasks are performed in the cloudlets, and based on the cover time $T_C$ and the average time $\overline{T}$, acquiring a transited-task expectation $$E_C = \frac{T_C}{\overline{T}};$$

Step S260: based on the transited-task expectation $E_C$, calculating a task quantity $E_L = M - E_C$ for the mobile device to perform locally; and Step S270: based on the task quantity $E_L$ for the mobile device to perform locally, the M tasks, and the data to be computed for the individual tasks, calculating a data volume $D_L$ for the first processor to compute locally, and based on the data volume $D_L$, the tolerable latency range T, and characteristic parameters of the first processor, setting the initial operating frequency $F_{Linitial}$. Under the stochastic model, the quantity of the tasks that can be handled by the cloudlets can be estimated according to the stochastic theory, and the expectation is used to set the initial operating frequency of the first processor, so as to reduce energy consumption at the mobile device. In the Markov process, the present operating frequency of the first processor is dynamically regulated according to the task scheduling situation, so as to ensure timely completion of the tasks. We can say that this is about making an overall estimation first and then making dynamic adjustment so as to achieve the optimal state gradually. For the dynamic decision using the Markov Decision Process, the tolerable latency range T of the task queue, or the deadline of the task queue, is considered, thereby ensuring the tasks to be done by the deadline with minimal energy consumption.

Preferably, the cover time $T_C$ is calculated using an equation:

$$T_C = \frac{L(1 - e^{-\pi R^2 \lambda_C})}{V};$$

wherein L is the distance from the starting point to the terminal point of the mobility of the user.

Preferably, average time $\overline{T}$ is calculated using an equation:

$$\overline{T} = \frac{\frac{\sum_{i=1}^{M} DT_i}{B_C} + \frac{\sum_{i=1}^{M} DC_i}{F_C}}{M}.$$

Preferably, data volume $D_L$ is calculated using an equation:

$$D_L = \frac{E_L}{M} \sum_{i=1}^{M} DC_i.$$

Preferably, initial operating frequency $F_{Linitial}$ is calculated using an equation: $F_{Linitial} = D_L / T$.

According to one preferred mode, the step of dynamically deciding a scheduling strategy for individual task of all the tasks using the Markov Decision Process, and setting the present operating frequency $F_L$ for the first processor of the mobile device corresponding to the scheduling strategy may comprise: defining a state space and an action space in the mobile device. The state space contains: states of the tasks to be performed, states of the cloudlet(s) available for connection, and a regulation range of the operating frequency of the first processor. The action space contains: a first action and a second action, in which the first action denotes that the task is performed locally, and the second action denotes that the task is transited to and performed in the cloudlets. The mobile device may use a Markov Decision Process and refer to the state space and the action space to obtain the optimal scheduling strategy through value iteration.

Figure 3:
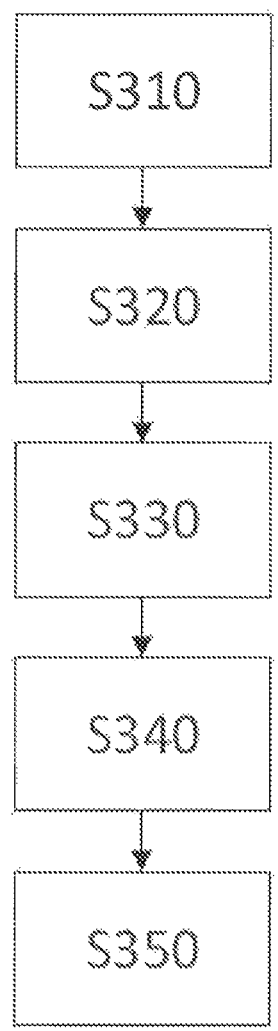
FIG. 3 is a flowchart showing sub-steps of Step 300 of the method of the present invention according to one preferred embodiment.

Preferably, referring to FIG. 3, Step S300 may comprise the following sub-steps: Step S310: setting the user state space $$\theta \in \{S=(i,N,F_L) \in S | i \in G, N \in \{0,1 \ldots \hat{N}\}, F_L \in (\{f_1, f_2 \ldots f_j\}\} \text{ and}$$

The action space A={0,1},
wherein i denotes the task performed presently, N denotes the number of the cloudlets presently available for connection, $F_L$ denotes the operating frequency of the first processor, 0 in the action space A denotes that the task is performed locally, and 1 in the action space A denotes that the task is transited to and performed in the cloudlets; Step S320: based on Poisson Distribution properties of the cloudlets and the cloudlet distribution density $\lambda_c$, calculating a probability $P^N$ (N, N') of the number of the cloudlets presently available for connection to the user, so as to obtain a state-transition matrix $\vec{N}$ of the cloudlets, wherein N is the number of the cloudlets available for connection in the present state S, and N' is the number of the cloudlets becoming available for connection when transition to a next state S' is completed; Step S330: based on $DT_i$ and $DC_i$ of the present task and an action $A_i$ taken, calculating a probability $P^G$ (G, G'|$A_i$) for the present task to successfully transit into the next task, so as to obtain a state-transition matrix $\vec{G}$ of the tasks; Step S340: based on the action $A_i$ taken, calculating a frequency transition probability $P^F(F_L, F'_L|A_i)$ of the first processor, so as to obtain a state-transition matrix $\vec{F}$ of the frequency, wherein $F_L$ is the operating frequency of the first processor in the present state S, and $F'_L$ is the operating frequency of the first processor possibly used by the mobile device when transition to the next state is completed; Step S350: based on an optimization target $$V_t(S) = \min_{\phi(S, A_i)} H_t(S, A_i),$$

calculating the scheduling strategy $$\phi_t^*(S) = \arg\min_{\phi(S, A_i)} H_t(S, A_i)$$

through value iteration, and based on the scheduling strategy setting the present operating frequency $F_L$ of the first processor, wherein $H_t(S, A_i)$ is user energy consumption generated when the action $A_i$ is taken in the state S, and $\emptyset(S, A_i)$ is a probability for the user to take the action $A_i$ in the present state S.

Preferably, the probability for the present task to successfully transit into the next task is calculated using an equation:

$$P^G(G, G' | A_i) = \begin{cases} \left(\frac{DT_i}{B_C} + \frac{DC_i}{F_C}\right) \times \frac{3V}{R} \times \eta_a & A_i = 1 \\ 1 & A_i = 0 \end{cases},$$

wherein $$\frac{3V}{R}$$

is an average time that the user maintains connection with the cloudlet, and $\eta_a$ is a probability for the presently connected cloudlet to accept a request of task transition from the user.

Preferably, the probability $\eta_a$ for the presently connected cloudlet to accept a request of task transition from the user is figured out based on a resource occupation level and/or a task queuing level of the presently connected cloudlet.

According to one preferred mode, when the probability for the previous task to successfully transit to the next task is smaller than a first threshold and the computing data volume of the present task is greater than a second threshold, transition to the next is done successfully.

Preferably, in the optimization target $$V_t(S) = \min_{\phi(S, A_i)} H_t(S, A_i),$$

$$H_t(S, A_i) = C(S, A_i) + \gamma \sum P(S, S' | A_i) V_{t+1}(S').$$

Therein, $H_t(S, A_i)$ is the energy consumption generated when the user takes the action $A_i$ in the state S. $C(S, A_i)$ is direct energy consumption generated by the first processor when the action $A_i$ is taken in the state S, and $\gamma$ is a discount factor of energy consumption generated by the first processor in the next state S'.

Figure 7:
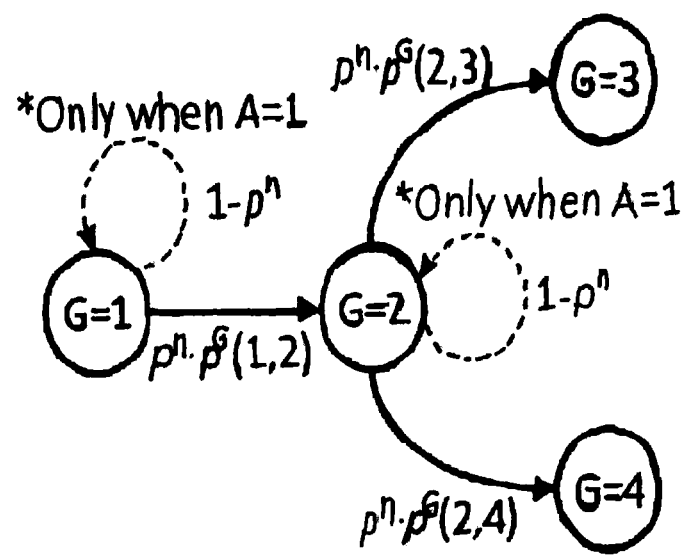
FIG. 7 is an exemplificative drawing illustrating state transition of tasks performed locally according to the present invention.

Referring to FIG. 7 for an exemplificative drawing illustrating state transition for tasks performed locally. For certain specific application, it may be divided into plural subtasks, such as $G_1$, $G_2$, $G_3$, and $G_4$ shown in FIG. 7. For $G_1$, when A=1, it will be transited to the cloud for execution, and there are two possible results. As the first one, transition is done successfully with the probability $P^n P^G(1,2)$, and the state transits from $G_1$ to $G_2$. As the second one, transition fails with the probability 1−$P^n$, and the state self-circulates to $G_1$. For $G_2$, when A=1, it will be transited to the cloud for execution, and there are three possible results. As the first one, transition is done successfully with the probability $P^n P^G(2,3)$, and the state transits from $G_2$ to $G_3$. As the second one, transition is done successfully with the probability $P^n P^G(2,4)$, and the state transits from $G_2$ to $G_4$. As the third one, transition fails with the probability 1−$P^n$ transition, and the state self-circulates to $G_2$. For $G_3$ and $G_4$, when A=1, if transition is done successfully, the process ends; otherwise, the process self-circulates to the present task.

Figure 8:
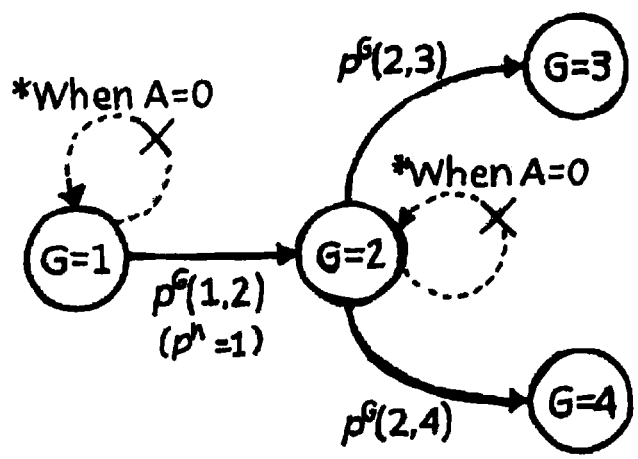
FIG. 8 is an exemplificative drawing illustrating state transition of tasks performed in cloudlets according to the present invention.

FIG. 8, similar to FIG. 7, is an exemplificative drawing illustrating state transition for tasks performed in the cloudlets. For $G_1$, when A=0, it will be performed locally, and there is only one possible result. That is, transition is done from $G_1$ to $G_2$ with the probability $P^G(1,2)$, and it is impossible for the state to self-circulate. For $G_2$, when A=0, it will be performed locally, and there are two possible results. As the first one, transition is done from $G_2$ to $G_3$ with the probability $P^G(2,3)$. As the second one, transition is done from $G_2$ to $G_4$ with the probability $P^G(2,4)$, and it is impossible for the state to self-circulate.

Figure 4:
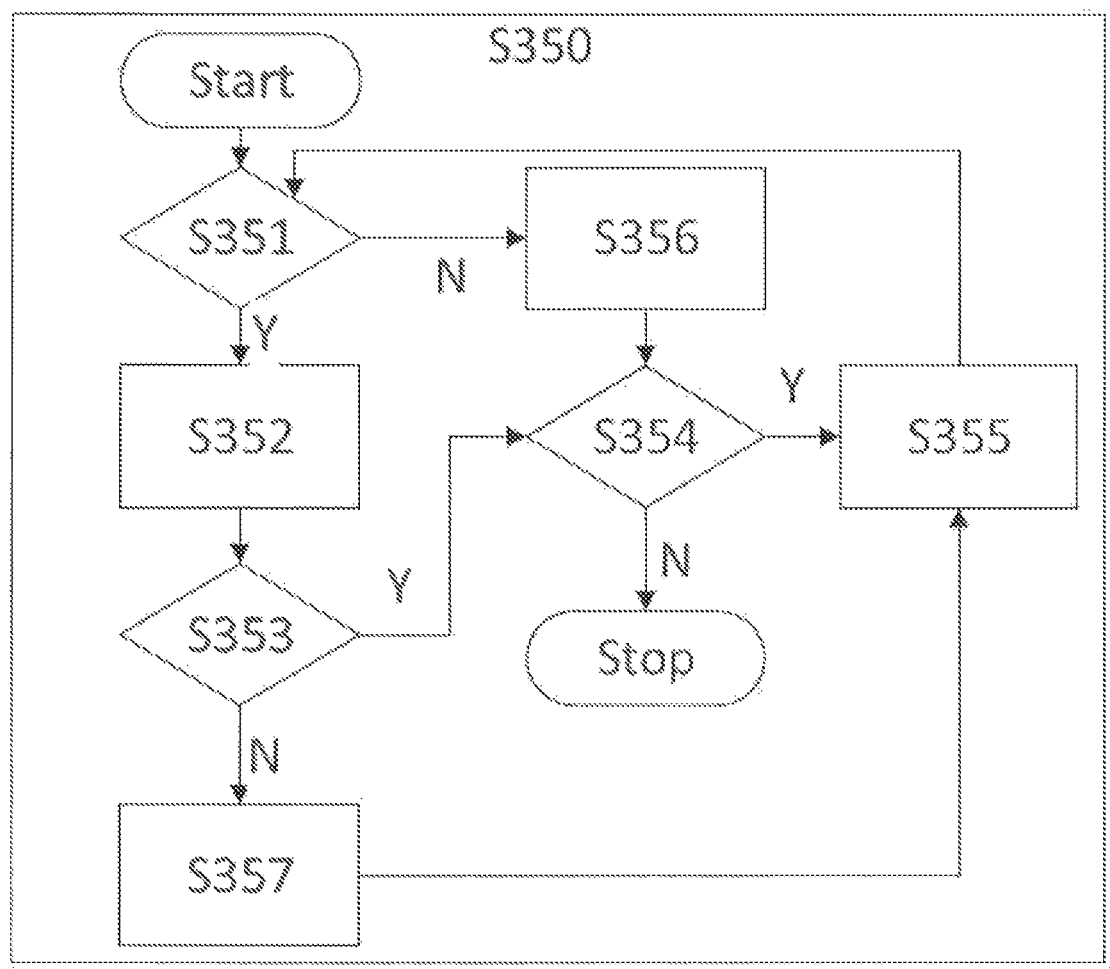
FIG. 4 is a flowchart showing sub-steps of Step 350 of the method of the present invention according to one preferred embodiment.

According to one preferred mode, referring to FIG. 4, Step S350 may comprise the following sub-steps: Step S351: determining whether the present task is performed in the cloud, and if yes, proceeding to Step S352; otherwise, proceeding to Step S356; Step S352: making the mobile device choose the nearest cloudlet for the transited task, and proceeding to Step S353;

Step S353: determining whether the transited task returns its result successfully, and if yes, proceeding to Step S354; otherwise, proceeding to Step S357; Step S354: determining whether there is any further tasks to be handled, and if yes, proceeding to Step S355; otherwise, ending the process at Step S350 until a subsequent task appears; Step S355: handling the next task, and proceeding to Step S351; Step S356: making the mobile device perform the present task locally, and proceeding to Step S354; and Step S357: increasing the present operating frequency $F_L$ of the first processor of the mobile device, attaching the present task to the tail of the task queue, and proceeding to Step S355.

According to one preferred mode, the disclosed method may further comprise: when the cloudlet connected presently fails to feed the result of the task back to the mobile terminal as scheduled, acquiring information about a different cloudlet that is likely to be connected by the user upon entry into the next state, and performing analysis so as to determine a maximum first duration where the feedback of the transited task is sent to the user through the said different cloudlet and second duration required by the user to perform re-computing of the transited tasks locally. In the event that the maximum first duration is smaller than the second duration, the mobile device is so set that when connected to the second cloudlet, it requires for the computing result of the transited task. Since there may be plural cloudlets connected in the next state, the locations and data rates of the plural second cloudlets generate different values of the corresponding first duration. Therefore, in the event that even the maximum one among these values of the first duration is smaller than the second duration, it is more likely that the user obtain the computing result of the transited task faster than performing re-computing the transited task locally. Particularly, in case the computing volume of the transited tasks is huge, this approach prevents waste of computing resources and increases the probability of timely completion of the task. According to the present invention, it can be easily contemplated that the process is performed by at least one of the cloudlets, a mobile device and a management device. Preferably, the process is performed using a management device, so as to unburden the cloudlets and/or mobile device form related computing load. Preferably, before performing this process, there is a step of determining whether the computing size of the transited task exceeds a third threshold. When the computing size of the transited task exceeds the third threshold, this process is used. When the computing load of the transited task is smaller than the third threshold, the mobile device performs re-computing for the transited task locally. The reason is that when the computing size of a task is relatively small, use of the process may increase the computing volume of the mobile device instead. In an example where the mode is to be performed by a mobile device, while re-computing the transited task locally may take 0.01 ms, doing this with the foregoing process would take 0.03 ms, disadvantageously adding computing load to the mobile device. Therefore, it is desired to predict the computing size of a task beforehand, and only using the mode for improving computing efficiency when the size is greater than the third threshold. More preferably, the mobile device is such configured that for it to require the computing result of the transited task when connected to the second cloudlet(s), the maximum first duration has to be smaller than the second duration and the ratio between the maximum first duration and the second duration is smaller than a fourth threshold. Considering the possibility that the actual first duration is greater than the theoretical first duration due to fluctuation generated when the mobile device is connected to the second cloudlet(s), by such configuring the mobile device that for it to require the computing result of the transited task when connected to the second cloudlet(s), the maximum first duration has to be smaller than the second duration and the ratio between the maximum first duration and the second duration is smaller than a fourth threshold, the probability of completing the task timely is further increased. The foregoing fluctuation may refer to change in mobility of the user, change in session duration between devices, or change in communication rate. For example, the fluctuation is change in mobility velocity of the user, change in moving direction of the user, or extension of session duration between the mobile device and the second cloudlet(s).

Embodiment 2

The present embodiment is further improvement based on Embodiment 1, and the repeated description is omitted herein.

The present invention further provides a device for cloudlet-based optimization of energy consumption. The device comprises: an initial operating frequency setting module 200, used for acquiring system data related to the mobile device from the cloudlet system for analyzing a data volume to be handled by the mobile device locally and setting an initial operating frequency $F_{L\,initial}$ for a first processor of the mobile device according to the data volume; and/or a Markov scheduling module 300, used for based on a tolerable latency range T of a task queue, dynamically deciding a scheduling strategy for individual task of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

Therein, the cloudlet system comprises: at least two cloudlets and a mobile device wirelessly connected to the cloudlets, so that the cloudlets provide the mobile device wirelessly connected thereto with cloud computing service.

Preferably, the initial operating frequency setting module 200 may be configured to perform the following steps: based on distribution properties of the at least two cloudlets and mobility characteristics of a user holding the mobile device, calculating a task quantity expectation $E_C$ for the tasks that the mobile device is expected to transit to the cloudlet system during its moving with the user; based on the task quantity expectation $E_C$, acquiring the data volume to be handled locally by the mobile device; and based on the task quantity expectation $E_C$, acquiring the data volume to be handled locally by the mobile device; and wherein the distribution properties obey Poisson Distribution two-dimensionally, and the mobility characteristics of the user obey a stochastic mobility model.

Preferably, Markov scheduling module 300 may be configured to perform the following steps: defining a state space and an action space in the mobile device, wherein the state space contains: states of the tasks to be performed, states of the cloudlet(s) available for connection, and a regulation range of the operating frequency of the first processor, and the action space contains: a first action and a second action, in which the first action denotes that the task is performed locally, and the second action denotes that the tasks is transited to and performed in the cloudlets.

The mobile device determines the scheduling strategy that is optimal according to the state space and the action space through value iteration.

Figure 5:
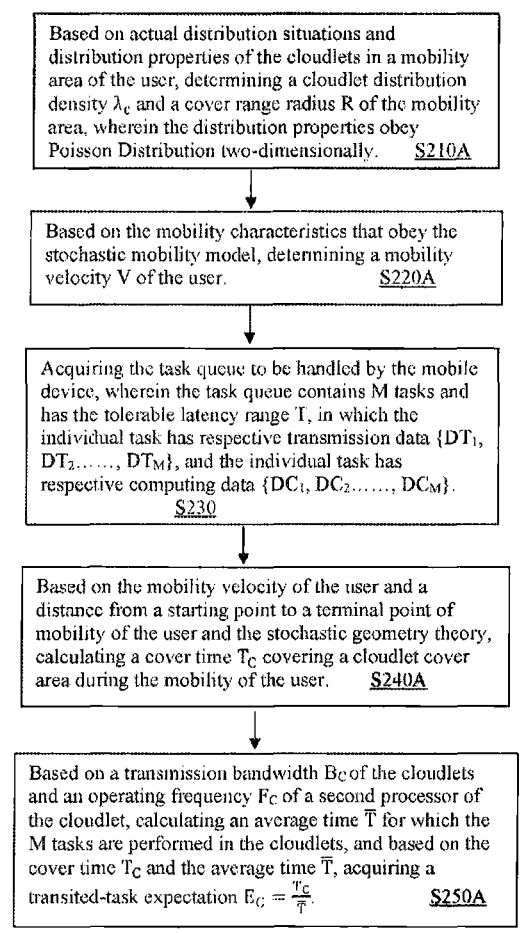
FIG. 5 is a schematic structural diagram of an initial operating frequency setting module of the present invention.

Further, referring to FIG. 5, the initial operating frequency setting module 200 may comprise:
a cloudlet distribution acquisition unit 210A, used for based on actual distribution situations and distribution properties of the cloudlets in a mobility area of the user, determining a cloudlet distribution density $\lambda_c$ and a cover range radius R of the mobility area, wherein the distribution properties obey Poisson Distribution two-dimensionally; a user mobility velocity acquisition unit 220A, used for based on the mobility characteristics that obey the stochastic mobility model, determining a mobility velocity V of the user; a task situation acquisition unit 230A, used for acquiring the task queue to be handled by the mobile device, wherein the task queue contains M tasks and has the tolerable latency range T, in which the individual task has respective transmission data $\{DT_1, DT_2 \ldots, DT_M\}$, and the individual task has respective computing data $\{DC_1, DC_2 \ldots, DC_M\}$; a cover time acquisition unit 240A, used for based on the mobility velocity of the user and a distance from a starting point to a terminal point of mobility of the user and the stochastic geometry theory, calculating a cover time $T_C$ covering a cloudlet cover area during the mobility of the user; a transited-task expectation acquisition unit 250A, based on a transmission bandwidth $B_C$ of the cloudlets and an operating frequency $F_C$ of a second processor of the cloudlet, calculating an average time $\bar{T}$ for which the M tasks are performed in the cloudlets, and based on the cover time $T_C$ and the average time $\bar{T}$, acquiring a transited-task expectation $$E_C = \frac{T_C}{\bar{T}};$$

a locally performed task quantity acquisition unit 260A, based on the transited-task expectation $E_C$, calculating a task quantity $E_L=M-E_C$ for the mobile device to perform locally; and an initial operating frequency setting unit 270A, used for based on the task quantity $E_L$ for the mobile device to perform locally, the M tasks, and the data to be computed for the individual tasks, calculating a data volume $D_L$ for the first processor to compute locally, and based on the data volume $D_L$, the tolerable latency range T, and characteristic parameters of the first processor, setting the initial operating frequency $F_{Linitial}$. It is to be noted that, the initial operating frequency setting module 200 of the present invention may be operated, packed and sold as a separate product.

Figure 6:
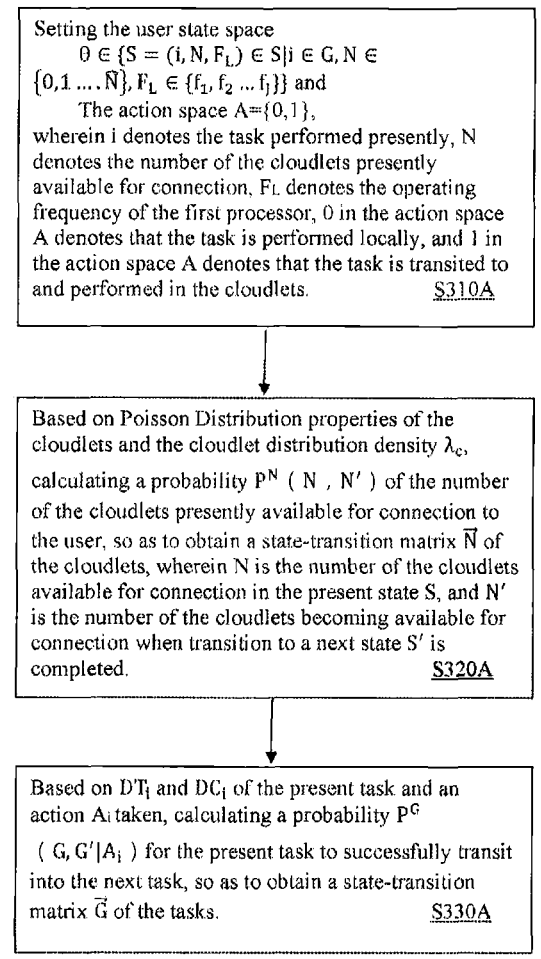
FIG. 6 is a schematic structural diagram of a Markov scheduling module of the present invention.

Further, referring to FIG. 6, the Markov scheduling module 300 may comprise: a state and action space setting unit 310A, for setting user state space $$\theta \in \{S=(i,N,F_L) \in S | i \in G, N \in \{0,1 \ldots \hat{N}\}, F_L \in \{f_1, f_2 \ldots f_j\}\} \text{ and}$$

action space A={0,1}, wherein i denotes the task performed presently, N denotes the number of the cloudlets presently available for connection, $F_L$ denotes the operating frequency of first processor, 0 in the action space A denotes that the task is performed locally, and 1 in the action space A denotes that the task is transited to and performed in the cloudlet; a first state-transition matrix acquisition unit 320A, based on Poisson Distribution properties of the cloudlets and the cloudlet distribution density $\lambda_c$, calculating a probability $P^N$ (N, N') of the number of the cloudlets presently available for connection to the user, so as to obtain a state-transition matrix $\vec{N}$ of the cloudlets, wherein N is the number of the cloudlets available for connection in the present state, and N' is the number of the cloudlets becoming available for connection when transition to a next state S' is completed; a second state-transition matrix acquisition unit 330A, used for based on $DT_i$ and $DC_i$ of the present task and an action $A_i$ taken, calculating a probability $P^G$ (G, G'|$A_i$) for the present task to successfully transit into the next task, so as to obtain a state-transition matrix $\vec{G}$ of the tasks; a third state-transition matrix acquisition unit 340A, used for based on the action $A_i$ taken, calculating a frequency transition probability $P^F$ ($F_L$, $F'_L$|$A_i$) of the first processor, so as to obtain a state-transition matrix $\vec{F}$ of the frequency, wherein $F_L$ is the operating frequency of the first processor in the present state S, and $F'_L$ is the operating frequency of the first processor possibly used by the mobile device when transition to the next state is completed; a present operating frequency regulation unit 350A, based on an optimization target $$V_t(S) = \min_{\emptyset(S,A_i)} H_t(S, A_i),$$

calculating the scheduling strategy $$\emptyset_t^*(S) = \arg \min_{\emptyset(S,A_i)} H_t(S, A_i)$$

through value iteration, and based on the scheduling strategy setting the present operating frequency $F_L$ of the first processor, wherein $\emptyset(S, A_i)$ is a probability for the user to take the action $A_i$ in the present state S.

Preferably, the device of the present embodiment is further suitable for performing other steps as described related to the foregoing embodiments, so as to achieve the expected technical effects.

Preferably, the initial operating frequency setting module 200 and/or the Markov scheduling module 300 may be at least one of an application-specific IC, a CPU, a microprocessor, a memory and a sensor. The initial operating frequency setting module 200 and the Markov scheduling module 300 may be separate units or may be integrated into a unit.

Preferably, the cloudlet distribution acquisition unit 210, the user mobility velocity acquisition unit 220, the task situation acquisition unit 230, the cover time acquisition unit 240, the transited-task expectation acquisition unit 250, the locally performed task quantity acquisition unit 260 and the initial operating frequency setting unit 270 may each be at least one of an application-specific IC, a CPU, a microprocessor, a memory and a sensor.

Preferably, the Markov scheduling module 300, the state and action space setting unit 310, the first state-transition matrix acquisition unit 320, the second state-transition matrix acquisition unit 330, the third state-transition matrix acquisition unit 340, and the present operating frequency regulation unit 350 may each be at least one of an application-specific IC, a CPU, a microprocessor, a memory and a sensor.

Embodiment 3

The present embodiment is further improvement based on Embodiments 1 and 2 and the combination thereof, and the repeated description is omitted herein.

The present invention further discloses a processor configured to perform the following steps:

Step S200: acquiring system data related to the mobile device from the cloudlet system for analyzing a data volume to be handled by the mobile device locally and setting an initial operating frequency $F_{Linitial}$ for a first processor of the mobile device according to the data volume; and Step S300: based on a tolerable latency range T of a task queue, dynamically deciding a scheduling strategy for individual task of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

According to one preferred mode, the processor is a first processor of the mobile device.

According to another alternative preferred mode, the processor is a second processor of the cloudlet.

Preferably, the processor is further suitable for performing other steps as described related to the foregoing embodiments, so as to achieve the expected technical effects.

Embodiment 4

The present embodiment is further improvement based on Embodiments 1, 2 and 3 and the combination thereof, and the repeated description is omitted herein.

The present invention further discloses a sensor configured to perform the following steps:

Step S200: acquiring system data related to the mobile device from the cloudlet system for analyzing a data volume to be handled by the mobile device locally and setting an initial operating frequency $F_{Linitial}$ for a first processor of the mobile device according to the data volume; and Step S300: based on a tolerable latency range T of a task queue, dynamically deciding a scheduling strategy for individual tasks of the task queue using a Markov Decision Process, and setting a present operating frequency $F_L$ for the first processor of the mobile device corresponding to the scheduling strategy, so as to enable the mobile device to complete the tasks within the tolerable latency range T with minimal energy consumption.

According to one preferred mode, the sensor is integrated in the mobile device. The sensor is connected to the first processor of the mobile device.

According to another alternative preferred mode, the sensor is integrated in the cloudlet. The sensor is connected to the second processor of the cloudlet.

According to another alternative preferred mode, the sensor is integrated in the management device. The sensor is connected to the third processor of the management device.

Preferably, the sensor is further suitable for performing other steps as described related to the foregoing embodiments, so as to achieve the expected technical effects.

Embodiment 5

A cloudlet system comprises: at least two cloudlets and a mobile device wirelessly connected to the cloudlets, so that the cloudlets provide the mobile device wirelessly connected thereto with cloud computing services; a first device that acquires system data related to the mobile device from the cloudlet system for analyzing a data volume to be handled by the mobile device locally and based on the data volume sets an initial operating frequency $F_{Linitial}$ for a first processor of the mobile device; wherein the first device based on a tolerable latency range T of a task queue dynamically decides a scheduling strategy for individual tasks of the task queue using a Markov Decision Process, and sets a present operating frequency $F_L$ for the first processor of the mobile device corresponding to the scheduling strategy, so as to enable the mobile device to complete the tasks within the tolerable latency range T with minimal energy consumption.

Preferably, the first device is the first processor or a sensor connected to the first processor.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for cloudlet-based optimization of energy consumption, comprises:

building a cloudlet system that comprises: at least two cloudlets and a mobile device wirelessly connected to the cloudlets, so that the cloudlets provide the mobile device wirelessly connected thereto with cloud computing services;

acquiring system data related to the mobile device from the cloudlet system for analyzing a data volume to be handled by the mobile device locally and setting an initial operating frequency $F_{Linitial}$ for a first processor of the mobile device according to the data volume, wherein:

based on distribution properties of the at least two cloudlets and mobility characteristics of a user holding the mobile device, calculating a task quantity expectation $E_C$ for the tasks that the mobile device is expected to transit to the cloudlet system during its moving with the user;

based on the task quantity expectation $E_C$, acquiring the data volume to be handled locally by the mobile device; and based on the data volume, setting the initial operating frequency $F_{Linitial}$ of the first processor of the mobile device, wherein, the distribution properties obey Poisson Distribution two-dimensionally, and the mobility characteristics of the user obey a stochastic mobility model; and based on a predetermined tolerable latency range T of a task queue, dynamically deciding a scheduling strategy for individual task of the task queue using a Markov Decision Process, and setting a present operating frequency $F_L$ for the first processor of the mobile device corresponding to the scheduling strategy, so as to enable the mobile device to complete the tasks within the predetermined tolerable latency range T with minimal energy consumption, including the steps of:

defining a state space and an action space in the mobile device, wherein the state space contains: states of the tasks to be performed, states of the cloudlet(s) available for connection, and a regulation range of the operating frequency of the first processor, and the action space contains: a first action and a second action, in which the first action denotes that the task is performed locally, and the second action denotes that the task is transited to and performed in the cloudlets; and based on the state space and the action space, determining the scheduling strategy that is optimal through value iteration; and making the mobile device set the present operating frequency FL of the first processor based on the scheduling strategy.

2. The method of claim 1, wherein the step of acquiring the system data related to the mobile device from the cloudlet system for analyzing the data volume to be handled by the mobile device locally and setting the initial operating frequency $F_{Linitial}$ for the first processor of the mobile device according to the data volume comprises:
- based on actual distribution situations and distribution properties of the cloudlets in a mobility area of the user, determining a cloudlet distribution density $\lambda_c$ and a cover range radius R of the mobility area, wherein the distribution properties obey Poisson Distribution two-dimensionally;
- based on the mobility characteristics that obey the stochastic mobility model, determining a mobility velocity V of the user;
- acquiring the task queue to be handled by the mobile device, wherein the task queue contains M tasks and has the predetermined tolerable latency range T, in which the individual task has respective transmission data $\{DT_1, DT_2 \ldots, DT_M\}$, and the individual task has respective computing data $\{DC_1, DC_2 \ldots, DC_M\}$;
- based on the mobility velocity of the user and a distance from a starting point to a terminal point of mobility of the user and the stochastic geometry theory, calculating a cover time $T_C$ during which the user passes a cloudlet cover area during the mobility of the user;
- based on a transmission bandwidth $B_C$ of the cloudlets and an operating frequency $F_C$ of a second processor of the cloudlet, calculating an average time $\overline{T}$ for which M tasks are performed in the cloudlets, and based on the cover time $T_C$ and the average time $\overline{T}$, acquiring a transited-task expectation $E_C = T_C/\overline{T}$;
- based on the transited-task expectation $E_C$, calculating a task quantity $E_L = M - E_C$ for the mobile device to perform locally; and
- based on the task quantity $E_L$ for the mobile device to perform locally, the M tasks, and the data to be computed for every individual task, calculating a data volume $D_L$ for the first processor to compute locally, and based on the data volume $D_L$, the predetermined tolerable latency range T, and characteristic parameters of the first processor, setting the initial operating frequency $F_{Linitial}$.

3. The method of claim 2, wherein the cover time $T_C$ is calculated using an equation $$T_C = \frac{L(1 - e^{-\pi R^2 \lambda_C})}{V},$$

wherein L is the distance from the starting point to the terminal point of the mobility of the user; and
the average time $\overline{T}$ is calculated using an equation:

$$\overline{T} = \frac{\frac{\sum_{i=1}^{M} DT_i}{B_C} + \frac{\sum_{i=1}^{M} DC_i}{F_C}}{M}.$$

4. The method of claim 1, wherein the step of based on the predetermined tolerable latency range T of the task queue, dynamically deciding the scheduling strategy for individual task of the task queue using the Markov Decision Process, and setting the present operating frequency $F_L$ for the first processor of the mobile device corresponding to the scheduling strategy, so as to enable the mobile device to complete the tasks within the predetermined tolerable latency range T with minimal energy consumption comprises:
- setting user state space $$\theta \in \{S = (i, N, F_L) \in S | i \in G, N \in \{0, 1 \ldots \hat{N}\}, F_L \in (\{f_1, f_2 \ldots f_i\}\} \text{ and}$$

action space A = $\{0, 1\}$,
wherein i denotes the task performed presently, N denotes the number of the cloudlets presently available for connection, $F_L$ denotes the operating frequency of first processor, 0 in the action space A denotes that the task is performed locally, and 1 in the action space A denotes that the task is transited to and performed in the cloudlets;
- based on Poisson Distribution properties of the cloudlets and the cloudlet distribution density $\lambda_c$, calculating a probability $P^N$ (N, N'): of the number of the cloudlets presently available for connection to the user, so as to obtain a state-transition matrix $\vec{N}$ of the cloudlets,
wherein N is the number of the cloudlets available for connection in the present state S, and N' is the number of the cloudlets becoming available for connection when transition to a next state S' is completed;
- based on $DT_i$ and $DC_i$ of the present task and an action $A_i$ taken, calculating a probability $P^G$ (G, G'|$A_i$) for the present task to successfully transit into the next task, so as to obtain a state-transition matrix $\vec{G}$ of the tasks;
- based on the action $A_i$ taken, calculating a frequency transition probability $P^F$ ($F_L$, $F'_L$|$A_i$) of the first processor, so as to obtain a state-transition matrix $\vec{F}$ of the frequency,
wherein $F_L$ is the operating frequency of the first processor in the present state S, and $F'_L$ is the operating frequency of the first processor possibly used by the mobile device when transition to the next state is completed;
- based on an optimization target $$V_t(S) = \min_{\phi(S, A_i)} H_t(S, A_i),$$

calculating the scheduling strategy $$\phi_t^*(S) = \arg\min_{\phi(S, A_i)} H_t(S, A_i)$$

through value iteration, and based on the scheduling strategy setting the present operating frequency $F_L$ of the first processor,
wherein $H_t(S, A_i)$ is user energy consumption generated when the action $A_i$ is taken in the state S, and $\emptyset(S, A_i)$ is a probability for the user to take the action $A_i$ in the present state S.

5. The method of claim 4, wherein the probability for the present task to successfully transit into the next task is calculated using an equation:

$$P^G(G, G' | A_i) = \begin{cases} \left(\dfrac{DT_i}{B_C} + \dfrac{DC_i}{F_C}\right) \times \dfrac{3V}{R} \times \eta_a & A_i = 1 \\ 1 & A_i = 0 \end{cases},$$

wherein $$\dfrac{3V}{R}$$

is an average time that the user maintains connection with the cloudlet, and $\eta_a$ is a probability for the presently connected cloudlet to accept a request of task transition from the user.

6. The method of claim 5, wherein the probability $\eta_a$ for the presently connected cloudlet to accept a request of task transition from the user is figured out based on a resource occupation level and/or a task queuing level of the presently connected cloudlet.

7. The method of claim 4, wherein in the optimization target $$V_t(S) = \min_{\phi(S, A_i)} H_t(S, A_i),$$

$$H_t(S, A_i) = C(S, A_i) + \gamma \sum P(S, S' | A_i) V_{t+1}(S'),$$

wherein $C(S, A_i)$ is direct energy consumption generated by the first processor when the action $A_i$ is taken in the state S, and $\gamma$ is a discount factor of energy consumption generated by the first processor in the next state S'.

8. A cloudlet system, comprising: at least two cloudlets and a mobile device wirelessly connected to the cloudlets, so that the cloudlets provide the mobile device wirelessly connected thereto with cloud computing services; and
a first device that acquires system data related to the mobile device from the cloudlet system for analyzing a data volume to be handled by the mobile device locally and sets an initial operating frequency FLinitial for a first processor of the mobile device according to the data volume; wherein:
based on distribution properties of the at least two cloudlets and mobility characteristics of a user holding the mobile device, calculating a task quantity expectation $E_C$ for the tasks that the mobile device is expected to transit to the cloudlet system during its moving with the user;
based on the task quantity expectation $E_C$, acquiring the data volume to be handled locally by the mobile device; and
based on the data volume, setting the initial operating frequency $F_{Linitial}$ of the first processor of the mobile device,
wherein, the distribution properties obey Poisson Distribution two-dimensionally, and the mobility characteristics of the user obey a stochastic mobility model,
wherein the first device, based on a predetermined tolerable latency range T of a task queue, dynamically decides a scheduling strategy for individual task of the task queue using a Markov Decision Process, and sets a present operating frequency FL for the first processor of the mobile device corresponding to the scheduling strategy, so as to enable the mobile device to complete the tasks within the predetermined tolerable latency range T with minimal energy consumption, including:
defining a state space and an action space in the mobile device, wherein the state space contains: states of the tasks to be performed, states of the cloudlet(s) available for connection, and a regulation range of the operating frequency of the first processor, and the action space contains: a first action and a second action, in which the first action denotes that the task is performed locally, and the second action denotes that the task is transited to and performed in the cloudlets; and
based on the state space and the action space, determining the scheduling strategy that is optimal through value iteration; and making the mobile device set the present operating frequency FL of the first processor based on the scheduling strategy.

* * * * *